(12) United States Patent
Greevenbosch et al.

(10) Patent No.: US 8,782,419 B2
(45) Date of Patent: Jul. 15, 2014

(54) DEVICE AND METHOD FOR A BACKUP OF RIGHTS OBJECTS

(75) Inventors: Bert Greevenbosch, Erlangen (DE);
Harald Fuchs, Roettenbach (DE);
Stefan Kraegeloh, Erlangen (DE);
Mercè Serra Joan, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 822 days.

(21) Appl. No.: 12/673,594

(22) PCT Filed: Aug. 13, 2008

(86) PCT No.: PCT/EP2008/006670
§ 371 (c)(1),
(2), (4) Date: Mar. 16, 2010

(87) PCT Pub. No.: WO2009/024283
PCT Pub. Date: Feb. 26, 2009

(65) Prior Publication Data
US 2011/0179279 A1 Jul. 21, 2011

Related U.S. Application Data

(60) Provisional application No. 60/956,440, filed on Aug. 17, 2007.

(51) Int. Cl.
*H04L 9/32* (2006.01)
(52) U.S. Cl.
USPC ............................................. 713/176

(58) Field of Classification Search
USPC .................................................. 713/171, 176
See application file for complete search history.

(56) References Cited

U.S. PATENT DOCUMENTS

| 2001/0008016 A1 | 7/2001 | Kotani et al. |
| 2004/0088541 A1* | 5/2004 | Messerges et al. ........... 713/156 |

(Continued)

FOREIGN PATENT DOCUMENTS

| EP | 1 601 214 A1 | 11/2005 |
| EP | 1 603 044 A1 | 12/2005 |

(Continued)

OTHER PUBLICATIONS

OMA Standard: "OMA-TS-DRM-V2_1-20061128-D—DRM Specification—Draft Version 2.1—Nov. 28, 2006", Nov. 28, 2006, 203 pages.

(Continued)

*Primary Examiner* — Peter Shaw
(74) *Attorney, Agent, or Firm* — Keating & Bennett, LLP

(57) ABSTRACT

A common backup format of a backup rights object according to embodiments of the present invention has the following features: License information that is not critical for cryptographic security of the rights object is kept in "plain text" with a well defined syntax in a first data container, license information that is critical for cryptographic security of the rights object is stored in cryptographically protected form that is specific for the originating device to which the rights object is bound to in a second data container, and the rights object is cryptographically signed by the originating device such that it may not be manipulated. The signature is stored in a third data container.

10 Claims, 6 Drawing Sheets

(56) References Cited

U.S. PATENT DOCUMENTS

| | | |
|---|---|---|
| 2004/0255138 A1 | 12/2004 | Nakae |
| 2005/0044361 A1 | 2/2005 | Chang et al. |
| 2006/0248595 A1* | 11/2006 | Kelly et al. ............. 726/27 |
| 2007/0056042 A1 | 3/2007 | Qawami et al. |
| 2007/0124583 A1* | 5/2007 | Andersson et al. ......... 713/165 |

FOREIGN PATENT DOCUMENTS

| | | |
|---|---|---|
| JP | 2000-048076 A | 2/2000 |
| JP | 2000-099403 A | 4/2000 |
| JP | 2004-259262 A | 9/2004 |
| RU | 2004 125 545 A | 1/2006 |
| WO | 2005/069102 A1 | 7/2005 |

OTHER PUBLICATIONS

Official Communication issued in corresponding International Patent Application No. PCT/EP2008/006670, mailed on Mar. 27, 2009.

Official Communication issued in corresponding International Application No. PCT/EP2008/006670, mailed on Nov. 17, 2009.

Official Communication issued in corresponding Japanese Patent Application No. 2010-521342, mailed on Jan. 5, 2012.

English translation of Official Communication issued corresponding Korean Patent Application No. 10-2010-7005464, mailed on May 3, 2011.

Official Communication issued in corresponding Korean Patent Application No. 2012-7022936, mailed on May 20, 2013.

* cited by examiner

DEVICE AND METHOD FOR A BACKUP OF RIGHTS OBJECTS

BACKGROUND OF THE INVENTION

The present invention generally relates to digital rights management and, more particularly, to a backup of digital rights.

Digital rights management (DRM) describes a concept by which media providers enforce limitations on usage and distribution of digital media content. Presently, there are number of DRM schemes in use. For example, mobile content providers use the Open Mobile Alliance (OMA) DRM system to protect digital mobile media content.

The OMA DRM family comprises digital rights management standards that are developed by the Open Mobile Alliance. To date, the OMA DRM family comprises:
  OMA Digital Rights Management 1.0 (DRM v1.0),
  OMA Digital Rights Management 2.0 (DRM v2.0),
  OMA Digital Rights Management 2.1 (DRM v2.1),
  OMA DRM v2.0 Extensions for Broadcast Support (XBS),
  OMA Secure Removable Media (SRM),
  OMA Secure Content Exchange (SCE).

The OMA DRM system enables content issuers to distribute DRM protected content and rights issuers (RIs) to issue rights objects (ROs) for the DRM protected content. The DRM system is independent of media object formats, operating systems, and run-time environments. Contents protected by DRM can be of a wide variety, including games, ring tones, photos, music clips, video clips, streaming media, etc. For a user consumption of the content, users acquire permission to DRM protected content by contacting rights issuers, i.e. an entity that issues rights objects to DRM conformant devices. Rights issuers grant appropriate permission for the DRM protected content to use it on DRM conformant devices. The content is cryptographically protected when distributed and, hence, will not be usable without an associated rights object (RO) issued for the users device.

DRM protected content can be delivered to the device by any means, for example, over the air, LAN/WLAN, local connectivity, removable media, etc. Rights objects, however, are tightly controlled and distributed by the rights issuer in a controlled manner. DRM protected content and rights objects may be delivered to the device together or separately.

Within the scope of the OMA DRM family, there is a fundamental difference between a backup of rights and a move of rights between devices.

The backup of rights comprises copying an OMA DRM v2.x rights object (RO) from a originating device to another medium or a backup-device. The copied rights object is called backup rights object. However, the backup rights object remains cryptographically bound to the originating device, such that it can only be restored or reinstalled to the originating device. A backup rights object cannot be used to exercise the rights on any other device than the originating device.

The backup of rights is possible from OMA DRM v2.0 onwards. The process of restoring or reinstalling a backup rights object and making it usable on the device is called installing a backup rights object.

Currently, backup-device storage of licenses or rights objects is limited to a plain backup function. The backup is seen as a "proprietary" function of the originating device to which the license or rights object is bound. The backup format is typically implementation (vendor) specific.

As an example, the OMA DRM standards specify that rights objects may be backed up but there is no common format, in which DRM rights objects are stored. The lack of specification of the format, results in proprietary backup formats for every vendor specific implementation. There is no provision to use the backed up ROs for other purposes than the backup function.

Currently, the OMA DRM standards where backup is foreseen are:
  OMA Digital Rights Management 2.0 (DRM v2.0),
  OMA Digital Rights Management 2.1 (DRM v2.1),
  OMA DRM v2.0 Extensions for Broadcast Support (XBS),
  OMA Secure Removable Media (SRM),
  OMA Secure Content Exchange (SCE).

OMA DRM v2.1, XBS, SRM and SCE are all based on OMA DRM v2.0. In the OMA DRM v2.0 specification, it is described that a rights object may leave the originating device, provided that it leaves "in a protected form". What this protected form exactly is, is not specified and depends on the implementation.

If the format of backed up rights objects is not specified, they can only be treated as "black boxes" on an external storage. By looking at a black box rights object, it is not possible
  to associate the license to the originating device,
  to associate the license to a specific media content,
  to evaluate rights offered by the rights object,
  to see who issued the rights object.

This makes it difficult for a user to keep track of the rights objects that the user has acquired for his devices. Even if the user backs up all his rights objects to a central off line storage, the user has no way to use this for an overview of his rights objects (and the remaining rights). If a users rights objects were acquired using more than one device, the user may have a difficult time to get a good overview of all his rights objects by looking at the individual devices. This situation is aggravated if part of his devices are portable devices with limited user interface options. Further, it may be difficult to restore the backed-up rights objects to the proper device. The user needs to "manually" keep track of an association between rights object and its originating device.

Vendor specific rights objects implementations make it difficult to write general tools for backup administration or management.

It may also be a problem that vendor specific implementations of the backup format may differ in security.

In addition there are specific problems for the OMA DRM family. One possibility to perform a "state of the art" backup of a OMA DRM rights object in a protected form, is by storing it in its original form on an off-device storage. However, this has the drawback that when such a rights object is restored to the originating device, it cannot be distinguished from an out-of-band delivered rights object, i.e. a rights object, which is not delivered via the rights object acquisition protocol (ROAP). Since restrictions apply for accepting out-of-band delivered rights objects, not all backed-up rights objects can be restored. For example, out-of-band delivered rights objects may be signed by the rights issuer, therefore non-signed rights objects may not be restored to the originating device from a backup device. If no special backup format is used and rights objects are backed-up by storing them unmodified on external storage, only signed rights objects can be restored.

SUMMARY

According to an embodiment, an apparatus for storing a backup version of a digital rights object bound to an originating device and related to a digital media content may have a parser which is adapted to acquire first information of the digital rights object, the first information not being critical for a usage of the digital media content, and to acquire second information of the digital rights object, the second information being critical for the usage of the digital media content, wherein the parser is adapted to acquire a rights encryption key of the digital rights object as at least a part of the second information, wherein the rights encryption key is used to encrypt/decrypt a content encryption key related to the digital media content; an encrypter for encrypting the second information using a secret of the originating device to acquire encrypted second information, wherein the encrypter is adapted to encrypt the acquired rights encryption key with a backup encryption key as the secret of the originating device, wherein the backup encryption key is a cryptographic key for a symmetric key-algorithm, wherein the backup encryption key is based on a further secret of the originating device and at least the first information, such that the backup encryption key is different for different backup rights objects with different first information; a signature generator being adapted to generate a signature of the originating device over at least the first information of the digital rights object; and a recorder which is adapted to store the first information in a way such that the first information is readable by at least a second device, to store the encrypted second information such that the encrypted second information is not readable by at least the second device, and to store the signature, such that the backup rights object has the stored first information, the encrypted second information and the signature.

According to another embodiment, a method for storing a backup version of a digital rights object bound to an originating device and related to a digital media content may have the steps of acquiring first information of the digital rights object, the first information not being critical for a usage of the digital media content, and acquiring second information of the digital rights object, the second information being critical for the usage of the digital media content, wherein a rights encryption key of the digital rights object is acquired as at least a part of the second information, wherein the rights encryption key is used to encrypt/decrypt a content encryption key related to the digital media content; encrypting the second information using a secret of the originating device to acquire encrypted second information, wherein the acquired rights encryption key is encrypted with a backup encryption key as the secret of the originating device, wherein the backup encryption key is a cryptographic key for a symmetric key-algorithm, and wherein the backup encryption key is based on a further secret of the originating device and at least the first information, such that the backup encryption key is different for different backup rights objects with different first information; generating a signature of the originating device over at least the first information of the digital rights object; and storing the first information in a way such that the first information is readable by at least a second device, to store the encrypted second information such that the encrypted second information is not readable by at least the second device, and to store the signature, such that the backup rights object has the stored first information, the encrypted second information and the signature.

According to another embodiment, a computer program may execute the above mentioned method, when the computer program runs on a computer or a micro-controller.

According to another embodiment, an apparatus for reading a backup rights object bound to an originating device and related to a digital media content, the backup rights object having stored first information not being critical for a usage of the digital media content, encrypted second information being critical for the usage of the digital media content and a signature of the originating device over at least the first information may have a processor for verifying the signature stored in the backup rights object, wherein the signature is based on a first secret of the originating device and at least the first information; and a decrypter for decrypting the encrypted second information based on a second secret of the originating device, wherein the second secret is a cryptographic key for a symmetric key-algorithm, and wherein the second secret is based on a further secret of the originating device and at least the first information, such that the second secret is different for different backup rights objects with different first information.

According to another embodiment, a method for reading a backup rights object bound to an originating device and related to a digital media content, the backup rights object having stored first information not being critical for a usage of the digital media content, encrypted second information being critical for the usage of the digital media content and a signature of the originating device over at least the first information may have the steps of verifying the signature stored in the backup rights object, wherein the signature is based on a first secret of the originating device and at least the first information; and a decrypter for decrypting the encrypted second information based on a second secret of the originating device, wherein the second secret is a cryptographic key for a symmetric key-algorithm, and wherein the second secret is based on a further secret of the originating device and at least the first information, such that the second secret is different for different backup rights objects with different first information.

According to another embodiment, a computer program may carry out the above mentioned method, when the computer program runs on a computer or a micro-controller.

Embodiments of the present invention also provide computer-programs for carrying out the inventive methods.

Embodiments of the present invention are based on the finding that the above-mentioned problems may be overcome, if a properly specified common format is used for backup of DRM rights objects.

According to embodiments of the present invention this common backup format has the following features:
  License information that is not critical for cryptographic security of the rights object is kept in "plain text" with a well defined syntax,
  license information that is critical for cryptographic security of the rights object is stored in cryptographically protected form that is specific for the originating device to which the rights object is bound to, and
  the rights object is cryptographically signed by the originating device such that it may not be manipulated.

According to an aspect of the present invention there is provided an apparatus for storing a backup version of a digital rights object bound to an originating DRM conformant device and related to a digital media content, the apparatus comprising a parser adapted to obtain first information of the digital rights object, the first information not being critical for a usage of the digital media content, and to obtain second information of the digital rights object, the second information being critical for the usage of the digital media content, an encrypter for encrypting the second information using a secret of the originating DRM conformant device to obtain encrypted second information, a signature generator being adapted to generate a signature of the originating DRM conformant device over at least the first information of the digital rights object, and a recorder which is adapted to store the first information in a way such that the first information is readable by at least a second DRM conformant device, to store the encrypted second information such that the encrypted second information is not readable by at least the second DRM conformant device, and to store the signature, such that the backup rights object comprises the stored first information, the encrypted second information and the signature.

According to another aspect of the present invention there is provided an apparatus for reading a backup rights object bound to an originating device and related to a digital media content, the backup rights object having stored first information not being critical for a usage of the digital media content, encrypted second information, being critical for the usage of the digital media content and a signature of the originating device over at least the first information. The apparatus comprises a processor for verifying the signature stored in the backup rights object. The signature is based on a first secret of the originating device and at least the first information. The apparatus comprises a decrypter for, in case the stored signature is correct, decrypting the encrypted second information based on a second secret of the originating device.

According to yet another aspect of the present invention there is provided a storage medium storing a backup rights object bound to an originating device and related to a digital media content, the backup rights object comprising a first data container storing first information of an original digital rights object, the first information not being critical for a usage of the digital media content, a second data container storing encrypted second information of the original rights object, the second information being critical for the usage of the digital media content, wherein the second information is encrypted by means of a secret of the originating device, and a third data container storing a signature of the originating device over at least the first information of the digital rights object.

As a specific embodiment for OMA DRM, the common file-format for the backup rights objects is defined in the following way.

A backup rights object comprises a cryptographically non-secure data container comprising, for example:
  an identification of the originating device that the rights object is bound to (Device ID);
  a rights object identifier, a media content identifier, usage permissions and constraints (e.g. for stateful rights objects);
  when the rights object is signed by the rights issuer (RI), the cryptographic signature and any information needed to verify the cryptographic signature.
  rights metadata, which may comprise a rights object version, a rights object alias, a RI identifier, a RI URL and a RI alias;
  a timestamp of the RO;

An OMA DRM backup rights object comprises a cryptographically secure data container comprising, for example:
  a Content Encryption Key (CEK) and/or
  a Rights Encryption Key (REK), which encrypts the CEK.

Except for the keys, the information in a backup rights object is kept unencrypted, i.e. only key information is encrypted. An inventive backup rights object is cryptographically secure against modification by a cryptographic signature. One way to generate this cryptographic signature is by using a private key of the originating device. The private key is kept secret, while a public key for public-key cryptography, also known as asymmetric cryptography, may be widely distributed. The cryptographic signature may be calculated over the whole backup rights object, except for the signature field itself. The use of the cryptographic signature may also ensure that the originating device can later verify that it generated the backup rights object itself.

An inventive backup rights object is secure against key leaking, for example by encrypting the REK with a symmetric Backup Encryption Key (BEK), which is only known to the originating device, but different from the cryptographic keys that are used in regular rights objects.

To reduce the probability of a collusion attack, different backup rights objects may be protected with different cryptographic keys. To ensure that BEKs for different rights objects are statistically different, a BEK may be derived from a General BEK (GBEK) and specific information of the backup rights object. For example, a BEK may be calculated by taking a cryptographic hash over a concatenation of a part of the backup rights object (excluding the REK and the signature) and the GBEK.

According to the inventive concept an originating device is able to recover only those backup rights objects that were generated by itself. This may be ensured by the BEK.

The inventive common backup rights object format may also be used to backup broadcasted rights objects like OMA BCAST and DVB-H BCROs.

Employing the inventive common backup rights object format, backups from different originating devices have equivalent cryptographic security. The use of BEKs and signatures may also ensure a high cryptographic security. The device identification may be used as an extra binding of the backup rights object to a unique originating device.

The use of the BEK to protect the REK may increase the cryptographic security of the backup rights object. If the REK in a backup rights object was only protected by the originating device's public key, anyone would be able to calculate a valid encrypted REK.

The use of a different BEK for each backup rights object may ensure that a compromise of one BEK does not result in a leaking of REKs from other backup rights objects from the same originating device. Additionally, an attacker is only able to generate valid backup rights objects for content with a known CEK, when he obtains both the originating device's private key and the GBEK.

A common backup format, that is different from a normal rights object, allows the backup of all kind of rights objects (e.g. RI-signed and non-RI-signed rights objects). If a rights object without RI signature was backed-up in its original form, it could not be restored to the originating device, since the RI signature is mandated in order to install an out-of-band delivered rights object.

The inventive common backup format may enable software tools to process backup rights objects without using or acquiring secret information. The software remains agnostic of the cryptographic keys, but can process the other information in the backup rights objects, e.g. for archiving purposes. The inclusion of the originating device ID in the backup rights object may allow an archive software to identify and select backup rights objects for a particular originating device.

The inventive common backup format does not constrain a location of a backup rights object: it may be stored on a local, non-secure medium, but also in a central database on the internet. In the latter case, the originating device ID is especially useful for relating backup rights object to particular users.

In case a user's originating device breaks down, depending on the rights issuer's policy, an inventive backup rights object could be used as a proof that the user was in possession of the original rights object. The rights issuer could then re-issue a copy of the original rights object to a new device. For this case the rights issuer needs the originating device certificate to verify the signature stored in the backup rights object. Therefore, the device certificate could be backed-up too, either as part of a backup rights object or in a separate file.

Other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention are described in the following with reference to the accompanying drawings, in which.

DETAILED DESCRIPTION OF THE INVENTION

Figure 1:
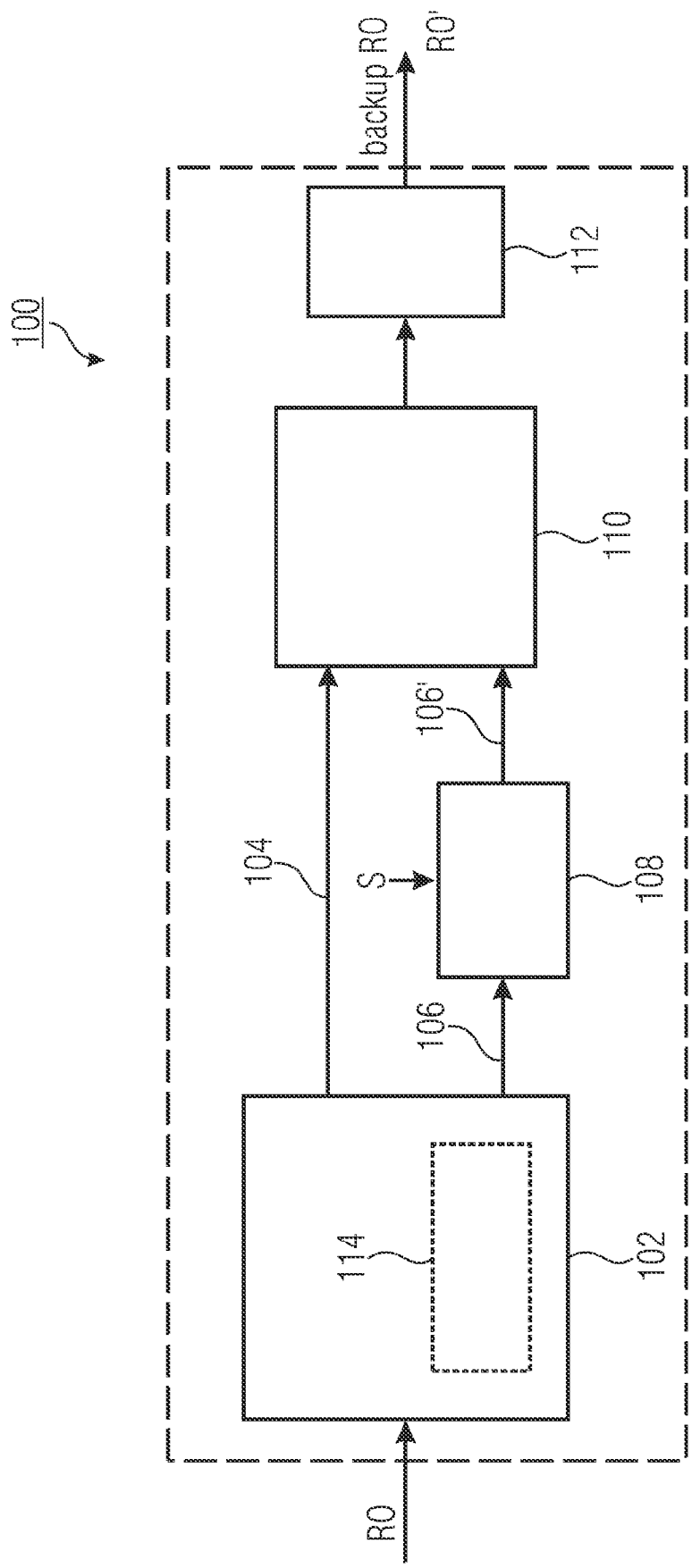
FIG. 1 shows an apparatus for storing a backup rights object according to an embodiment of the present invention.

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using non-limiting example applications to different DRM embodiments, the technology may be employed to any type of DRM system. In some instances, detailed descriptions of well known methods, interfaces, circuits, and device are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Before describing the inventive concept and various embodiments of the present invention with reference to FIGS. 1 to 6, it shall be explained in the following sections how a content encryption key (CEK) is wrapped in various other cryptographic keys in a conventional OMA DRM rights object. Thereby, the CEK may be used for decrypting digital media content related to the digital rights object.

The CEK may usually not be transmitted unencrypted from the rights issuer to a DRM conformant device, since it may be revealed and used by other devices not possessing a related digital rights object. The CEK hence has to be transferred from the RI to the DRM conformant device in an encrypted manner. The OMA DRM specifications use public key methods for this reason. For a digital rights object meant to be used on one single DRM conformant device, the OMA DRM method works in the following way:

The DRM conformant device has attached to it a device certificate (or electronic biometric data) which binds a device ID to a public encryption key (a pair (m,e) of natural numbers). A corresponding private en-/decryption key d (also a natural number) is only known to the DRM conformant device.

The rights issuer checks the device certificate and generates a rights encryption key (REK), a message authentication code key (MK) and a random number Z in the range between 0 and m−1. The key MK is used to protect the rights object of changes.

The rights issuer generates a key encryption key (KEK) by means of a hash function of Z. Z is encrypted to first encrypted information C1 by means of the public key (m,e). Further, a concatenation of REK and MK is encrypted to second encrypted information C2 by means of KEK. Further, CEK is encrypted to third encrypted information C3 by means of REK. CEK is that cryptographic key with which data content of associated digital media is encrypted. Finally, the rights object comprising the encrypted data C1, C2 and C3 is sent from the rights issuer to the DRM conformant device.

Encrypted media content in a digital media object is typically not obtained from the rights issuer, but via a different communications channel. The DRM conformant device now has access to an encrypted digital media object and an associated digital rights object with the cryptographic data C1, C2 and C3. In order to be able to decrypt the encrypted media content, the DRM conformant device performs the following steps:

Firstly, Z is decrypted by means of C1 and the DRM conformant device's private key d. Then, the key encryption key KEK is derived from Z in the same way as it has been described above for the rights issuer. By means of the derived KEK, the DRM conformant device decrypts the cryptographic keys REK and MK. By means of MK, the DRM conformant device may verify, whether the rights object has remained unchanged. By means of the rights encryption key REK, the DRM conformant device may decrypt the content encryption key CEK. Finally, knowing CEK, the DRM conformant device may now decrypt and replay the encrypted digital media content.

Since DRM conformant devices such as laptops, PDA's, mobile phones, etc, have a limited amount of storage space in which to store DRM content and associated rights objects, users may desire to move DRM content and/or associated rights objects off the device, for example to removable memory, a personal computer, or a network storage to make room for new DRM content and rights objects. At some later point in time, users may want to retrieve said DRM content and rights object from the remote storage back on to the originating device's storage. As explained before, both the DRM content and the associated rights objects are protected and bound to a specific device or a domain of devices.

According to OMA DRM v2.1, DRM content and rights objects may be allowed to leave a DRM conformant device in a protected form, meaning that they cannot be accessed by any other device/domain than their original intended device/domain to which the rights were issued. However, what this protected form exactly is, is not specified and depends on vendor specific implementations.

The problems that come with such vendor specific implementations have already been explained in the introductory portion of this specification.

Hence, embodiments of the present invention, which will be described in the sequel, provide a properly specified common backup format which may be used for a backup of DRM licenses or rights objects. A schematic block diagram of an apparatus 100 for storing an inventive backup version of a digital rights object RO bound to an originating DRM conformant device is shown in FIG. 1.

The apparatus 100 comprises a parser 102 for parsing the digital rights object RO to obtain first information 104 of the digital rights object RO, wherein the first information 104 is not critical for a usage of digital media content associated to the RO. The parser 102 is further adapted to obtain second information 106 of the RO, wherein the second information 106 is critical for the usage of the digital media content. For that reason, the apparatus 100 further comprises an encrypter 108 for encrypting the second information 106 using a secret s of the originating device to obtain encrypted second information 106'.

The first information 104 and the encrypted second information 106' are input to a recorder 110 which is adapted to store the first information 104 in a way such that the first information 104 is readable by at least a second DRM conformant device different from the originating device, and to store the encrypted second information 106' such that the encrypted second information 106' is not readable by the at least second DRM conformant device.

A signature generator 112 is adapted to generate a signature of the originating device over at least the first information 104.

A backup rights object RO' at the output of the apparatus 100 comprises the first information 104, the encrypted second information 106' and the signature of the originating device.

Figure 2:
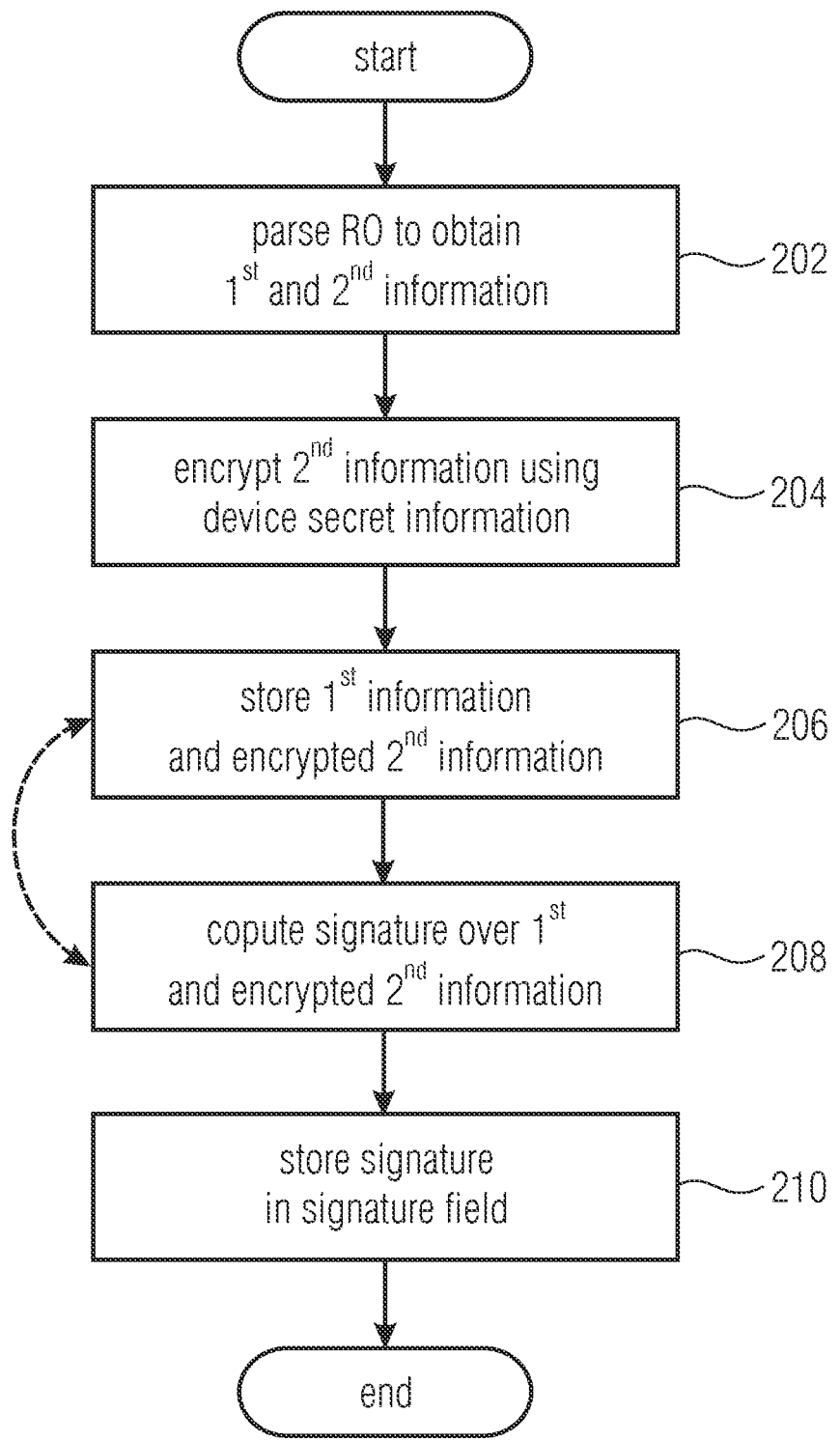
FIG. 2 shows a flow chart of a method for storing a backup rights object according to an embodiment of the present invention.

Single steps of an inventive method carried out by the apparatus 100 shall be now explained turning to FIG. 2.

After the RO has been input to the parser 102, the parser 102 parses the RO in order to obtain the first information 104 and the second information 106 in a first step 202. The first information 104 thereby is not critical for cryptographic security of the digital rights object RO. In other words, the first information 104 may be any information which is not related to securing the integrity of the CEK comprised by the RO. That is, the first information 104 is not related to cryptographic key information. The second information 106, on the other hand, is information that is critical for the cryptographic security for the rights object RO and/or the associated digital media content. According to embodiments of the present invention, the second information 106 refers to cryptographic key information stored in the rights object RO. According to a preferred embodiment of the present invention the parser 102 is adapted to obtain the REK of the RO as at least a part of the second information 106. As it has been explained before, the REK is used to encrypt/decrypt the CEK, that is, the REK is cryptographically protecting the CEK. In order to extract the REK from the RO, the parser 102 may comprise a decoding means 114 which is adapted to derive the REK from the encrypted random number Z as has been explained before.

Also, embodiments of the present invention allow for the extraction of a still encrypted REK. The second information may also be the encrypted key information C1 and/or C2 and/or C3.

In a further step 204, the encrypter 108 encrypts the extracted second information 106 by using a secret information s only known to the originating DRM conformant device. This secret shall be denoted as backup encryption key (BEK) in the following. According to an embodiment of the present invention, the BEK may be a symmetric encryption key which is different from the public and may be different from the private cryptographic keys that are used in conventional digital rights objects.

However, the secret BEK may also be based on the private key d of the originating DRM conformant device. That is, in step 204 the second information 106 is encrypted by using the originating DRM conformant device's specific BEK. For example, the second information 106 may be an already decrypted REK, which is re-encrypted using the BEK in step 204. Also, according to other embodiments, the second information may be still encrypted key information of the RO (e.g. C1 and/or C2 and/or C3) which is again wrapped or encrypted with the BEK to obtain the encrypted second information 106'.

In a next step 206 the first information 104 and the encrypted second information 106' are stored in respective file containers of the backup RO'. The storing 206 may be performed locally on the originating DRM conformant device or it may be performed remotely on a remote backup storage.

In a further step 208 the signature generator 112 computes an originating DRM conformant device specific signature over at least the first information 104. According to another embodiment of the present invention, the signature may also be computed over the first information 104 and the encrypted second information 106'. One way to generate the signature is by using the originating DRM conformant device's private key d. The signature may be calculated over the whole backup rights object RO' except for the signature field itself, i.e. over the first information 104 and the encrypted second information 106'. The use of the signature may ensure that the originating DRM conformant device may later verify that it generated the backup rights object RO' itself.

As indicated in FIG. 2, steps 206 and 208 may also be executed in reverse order, since storing the first information 104 and the encrypted second information 106' is not needed for computing the signature over said information.

In a step 210, the signature is stored in a signature field of a signature container of the backup rights object RO'.

Figure 3:
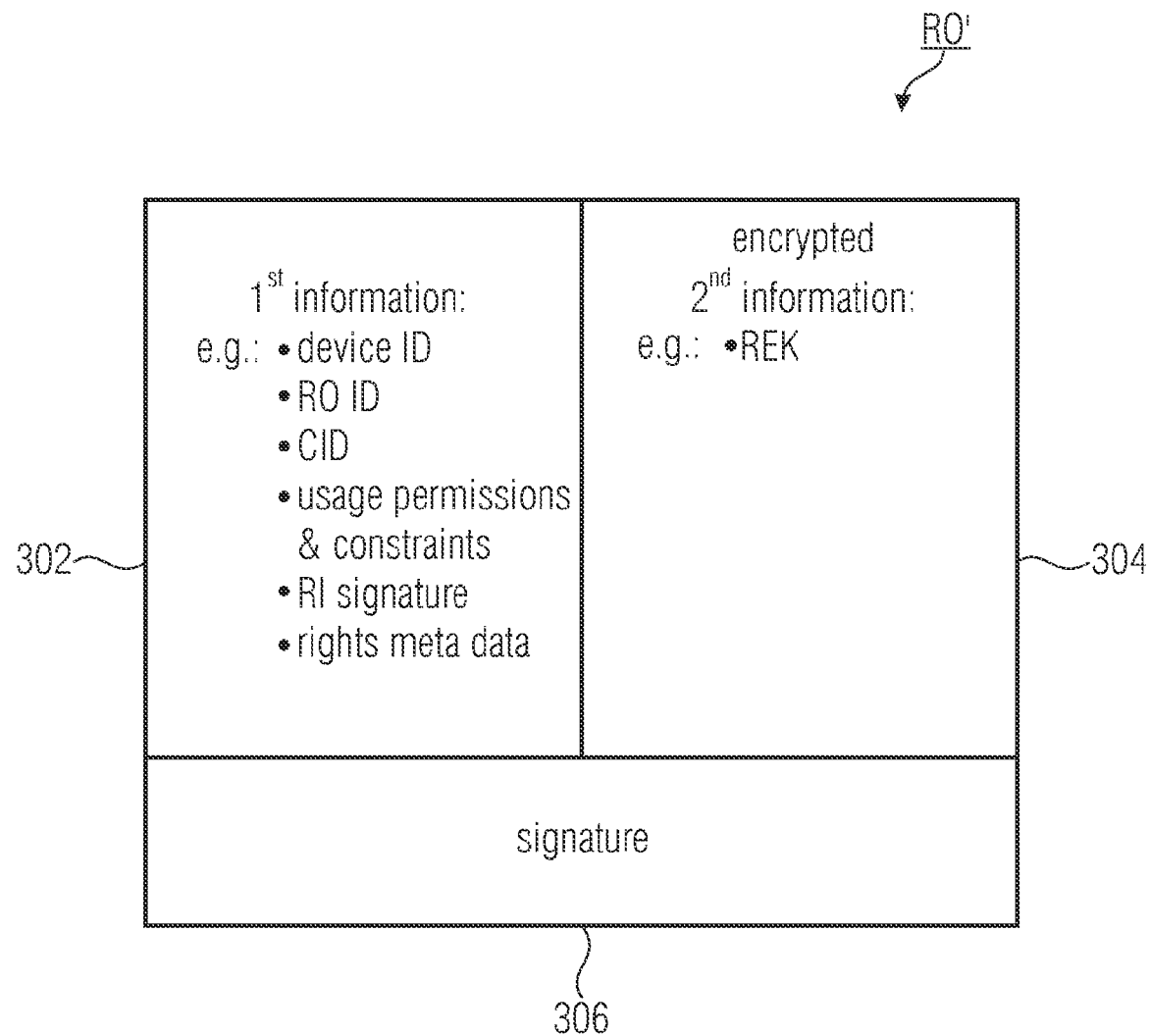
FIG. 3 schematically shows a file-format of a backup rights object according to an embodiment of the present invention.
Figure 4:
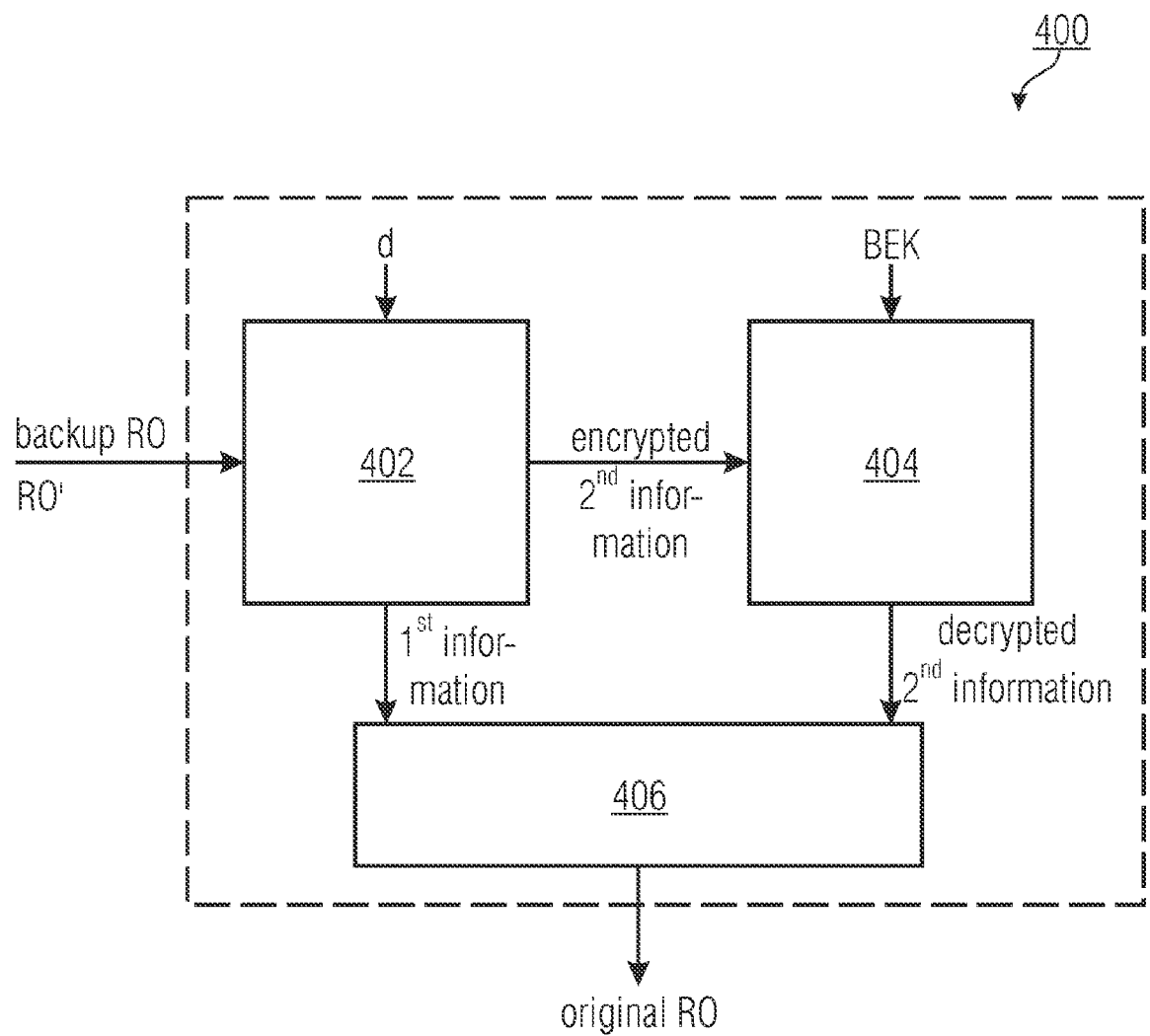
FIG. 4 schematically shows an apparatus for reading a backup rights object according to an embodiment of the present invention.

The resulting file format of the backup rights object RO' is shown in principle in FIG. 3.

An inventive backup rights object RO' comprises a first data container 302 for the first information 104, a second data container 304 for the encrypted second information 106' and a signature field or signature container 306 for the backup RO signature.

The first data container 302 may comprise license information which is not critical for the cryptographic security of the license and or the associated media content and which therefore may be kept in plain text in a well defined syntax. The first data container 302, i.e. the first information 104, may comprise the device ID of the originating DRM conformant device, a content ID identifying the associated digital media content and usage permissions and constraints related to the associated digital media content, such as states of a stateful rights object. In case the original rights object RO is signed by a rights issuer, the first information 104 may also comprise the RI-signature and any information needed to verify the RI-signature. Note, that in OMA DRM v2.0 and v2.1 all this information consists of the <rights> element and the <signature> element in the RO payload. In SRM this information consists of the rights object container. Further, rights meta data comprising, for example, a RO version, a RO alias, a RI identifier, a RI URL and a RI alias may be comprised by the uncritical first information 104. Also, a time stamp of the original and/or backup rights object RO, RO' may be comprised by the first data container 302.

The license information that is critical for cryptographic security is stored in cryptographically protected form which is specific for the originating DRM conformant device in the second data container 304. That is, according to an embodiment, cryptographic key information related to protecting the CEK is encrypted using the device specific BEK and stored in the data container 304. As explained before, the cryptographic key information may be the rights encryption key REK which encrypts the CEK. However, also other key information is possible, for example, C1, C2 and/or C3. Only key information is encrypted and all the other information is kept in clear form in the backup rights object RO'.

The backup signature of the backup rights object RO' is dependent on, for example, the DRM conformant device's private key d. The backup signature shall ensure that it can be verified at a later stage that the backup rights object RO' has been left unchanged and that it has been generated by the originating DRM conformant device itself.

To reduce a probability of a collusion attack, different backup rights objects of the same originating device may be protected with different backup encryption keys, according to an embodiment of the present invention. To ensure that backup encryption keys for different backup rights objects are statistically different, the backup encryption key BEK may be derived from a general backup encryption key (GBEK) and specific information related to the backup rights object RO'. For example, a BEK may be calculated by taking a cryptographic hash over a concatenation of the GBEK and at least a part of the backup rights object RO', excluding the encrypted second information 106' and the backup signature.

In summary, the originating DRM conformant device is able to recover only those backup rights objects that were generated by itself. This is ensured by the usage of the device specific backup encryption key BEK.

Once a backup rights object RO' has been generated and possibly stored on an external storage medium, such as e.g. a secure removable media card or the like, a user might want to re-install the backup rights object RO' on the originating DRM conformant device. For this reason, embodiments of the present invention provide an apparatus 400 for reading a backup rights object RO' bound to the originating device. Such an apparatus 400 is shown in a schematic block diagram in FIG. 4.

The apparatus 400 comprises a processor 402 for verifying the backup signature stored in the backup rights object RO', wherein that signature is based on a first secret, i.e. a public or private key d, of the originating device and at least the first information 104 stored in the first data container 302 of the backup rights object RO'. The verification may e.g. be done based on a comparison of the backup signature stored in the backup rights object RO' with a second signature calculated based on the first secret. Thereby the second signature may be calculated in the same manner as backup signature. the Further, the apparatus 400 comprises a decrypter 404 for decrypting the encrypted second information 106' based on a second secret, i.e. BEK, of the originating device. According to an embodiment of the present invention, the first secret and the second secret of the originating device may be different, identical or be derived from each other.

The apparatus 400 may be incorporated by a DRM conformant device, in particular an OMA DRM conformant device. However, the apparatus 400 may also be located externally from the originating DRM conformant device such that the backup rights object or its original version may be reinstalled to the originating DRM conformant device by means of an according interface between the apparatus 400, which may be comprised by an external server, and the originating DRM conformant device.

According to an embodiment of the present invention, the decrypter 404 only decrypts the encoded second information 106' if the verification of the backup signature in block 402 was successful, i.e. the signature is correct. As said before, the verification may be based on a comparison of the backup signature and the computed second signature. In this case, the decrypter 404 outputs the decrypted second information 106 which can be combined with the first information 104 in a combiner 406 in order to obtain the original rights object RO, which may then be reinstalled on the originating device.

Figure 5:
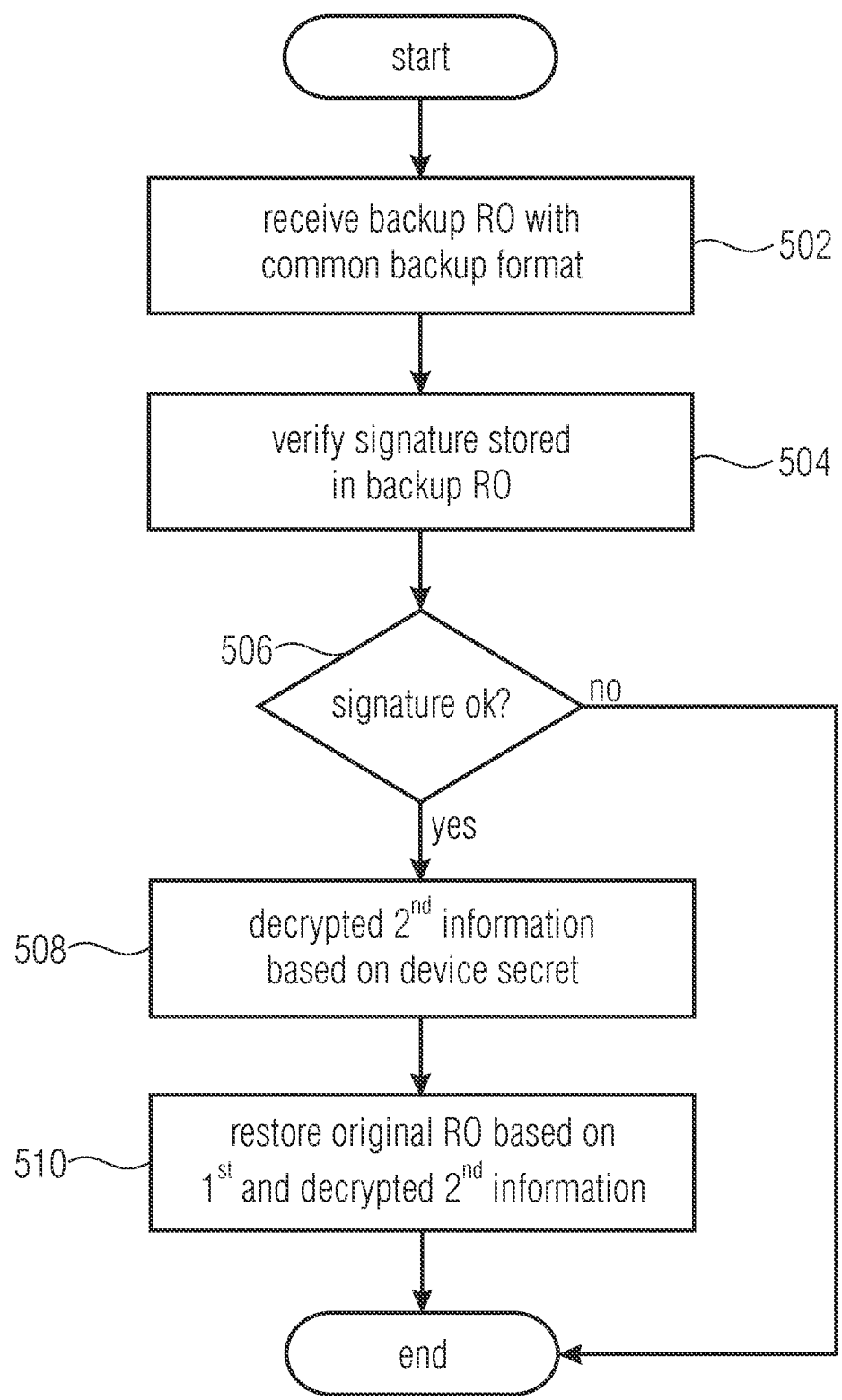
FIG. 5 shows a flow chart of a method for reading a backup rights object according to an embodiment of the present invention.

An embodiment of an inventive method carried out by the apparatus 400 shall be explained in the following referring to FIG. 5.

In a first step 502 the backup rights object RO' in the inventive common backup data format is received for example from a remote storage at the originating DRM conformant device. For this reason, the originating DRM conformant device may have an interface connecting the originating device with the remote storage, wherein the interface may be a wireless or wire-line interface.

In step 504 the backup signature stored in the signature container 306 of the backup rights object RO' is verified, using e.g. the private key d of the DRM conformant device and at least the stored first information 104. Also, the stored first and stored encrypted second information 106' may be used for computing the signature, as has been explained before. If the stored backup signature is correct, this indicates that the backup rights object RO' has not been changed by a potential attacker and
been generated by the DRM conformant device itself.

The outcome of the stored backup signature verification is processed in step 506.

If the check 504 indicates that the stored backup signature is correct, the encrypted second information 106' stored in the second data container 304 of the backup rights object RO' is decrypted in step 508 based on a further secret information of the originating DRM conformant device. This further secret is the formally mentioned backup encryption key BEK, which has already been used for encrypting the second information 106.

After step 508 the original rights object may be restored in step 510 based on the first information 104 and the decrypted second information 106. In this case the original digital rights object RO may be re-installed on the originating DRM conformant device.

By defining the common inventive backup format, as it was shown schematically in FIG. 3, backups of rights objects from different originating DRM conformant devices have equivalent security. The use of backup encryption keys (BEKs) and signatures may also ensure a high cryptographic security. The device ID of the originating device may be an extra binding of the backup rights object RO' to a unique originating device. The use of the backup encryption key to cryptographically protect the rights encryption key may increase the cryptographic security. If the rights encryption key in a backup rights object was only protected by the originating device's public key, anyone would be able to calculate a valid encrypted rights encryption key.

The use of a different BEK for each backup rights object ensures that a compromise of one BEK does not result in the leakage of REKs from other backup rights objects of the same originating device. Additionally, an attacker is only able to generate valid backup rights objects for content with a known content encryption key, when he obtains both the device private key d and the general backup encryption key GBEK.

The inventive common backup format is different from a conventional RO format and allows the backup of all kinds of rights objects, e.g. rights objects signed by a rights issuer or non-signed rights objects. If a rights object without RI-signature was backed-up in the original form, it could not be restored, since the RI signature is mandated in order to install an out-off-band delivered rights object.

The inventive common format enables software tools to process backup rights objects RO' without using or acquiring secret information. The software remains agnostic of cryptographic keys, but can process the other information in the backup rights object, e.g. for archiving purposes. The inclusion of the device ID in the backup rights object allows the archive software to identify and select backup rights objects for a particular originating device.

Also, the inventive backup format does not constrain the location of the backup RO. It can be stored on a local, non-secure medium, but also in a central database on the Internet. In the latter case, the device ID is especially useful for relating backup rights objects to particular users for originating DRM conformant devices.

When a users DRM conformant device breaks down, depending on the rights issuers policy, the inventive backup rights objects could be used as a proof that the user possessed a related original rights object. A rights issuer could then re-issue the original rights object to a new DRM conformant device. For this case, the rights issuer needs the originating device's certificate to verify the signature. Therefore, according to embodiments of the present invention, the originating device's certificate could be backed-up, too, either as a part of the backup rights object RO' or in a separate file.

Figure 6:
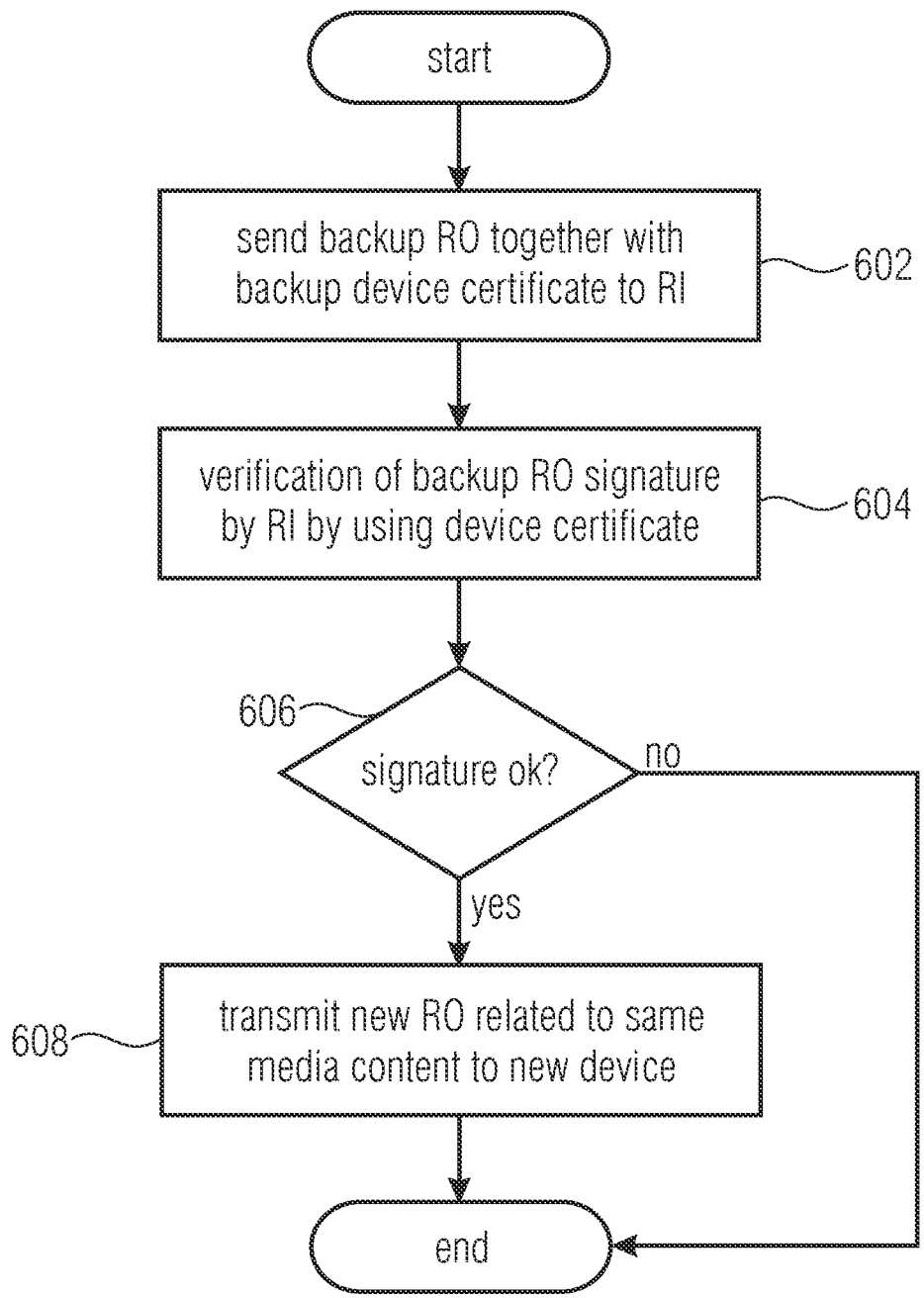
FIG. 6 shows a flow chart of a method for proving a former possession of a rights object according to an embodiment of the present invention.

The process of re-issuing an original rights object to a new device, if the originating DRM conformant device has broken down, is schematically shown in FIG. 6.

In a first step 602, the backup rights object RO' is sent to the rights issuer RI together with an also backed-up device certificate of the broken-down DRM conformant device.

Based on the received device certificate and the backup rights object, a verification of the backup signature can be performed by the rights issuer in step 604. The outcome of the verification of is processed in step 606. If the backup signature is not correct, there is an indication that either the backup rights object has been modified by an attacker or that the backup rights object has not been created by the broken-down DRM conformant device. In this case the procedure is terminated and a new rights object is not installed. In case the backup signature is correct, the rights issuer may transmit 608 a new (original) rights object related to the same digital media content as the backup rights object to the new DRM conformant device.

Depending on the circumstances, the inventive methods may be implemented in hardware or software. The implementation may be done on a digital storage medium, particularly a disc, CD or DVD with electronically readable control signals, which may cooperate with a programmable computer system such that the method is executed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several embodiments, there are alterations, permutations and equivalents which fall within the scope of this invention. It should also be noted that there are many alternative ways of implementing the methods and compositions of the present invention. It is therefore intended that the following appended claims be interpreted as including all such alterations, permutations and equivalents as falling within the true spirit and scope of the present invention.

The invention claimed is:

1. An apparatus for storing a backup version of a digital rights object bound to an originating device and related to a digital media content, the apparatus comprising:
a parser which is adapted to acquire first information of the digital rights object, the first information not being critical for a usage of the digital media content, and to acquire second information of the digital rights object, the second information being critical for the usage of the digital media content, wherein the parser is adapted to acquire a rights encryption key of the digital rights object as at least a part of the second information, wherein the rights encryption key is used to encrypt/decrypt a content encryption key related to the digital media content;
an encrypter for encrypting the second information using a secret of the originating device to acquire encrypted second information, wherein the encrypter is adapted to encrypt the acquired rights encryption key with a backup encryption key, wherein the backup encryption key is the secret of the originating device, wherein the backup encryption key is a cryptographic key for a symmetric key-algorithm, wherein the backup encryption key is based on a further secret of the originating device and at least the first information, and wherein the first information is different for different backup rights objects;
a signature generator being adapted to generate a signature of the originating device over at least the first information of the digital rights object; and
a recorder which is adapted to store the first information in a way such that the first information is readable by at least a second device, to store the encrypted second information such that the encrypted second information is not readable by at least the second device, and to store the signature, such that the backup rights object comprises the stored first information, the encrypted second information and the signature.

2. The apparatus according to claim 1, wherein the parser is adapted to acquire information not being cryptographic key information as the first information of the digital rights object.

3. The apparatus according to claim 1, wherein the parser is adapted to acquire a device identification of the originating device, an identification of the digital rights object, an identification of the related digital media content, information on usage permissions and constraints related to the digital media content, a time stamp of the digital rights object, meta data of the digital rights object as the first information.

4. The apparatus according to claim 1, wherein the meta data comprises a version identifier of the digital rights object, an alias of the digital rights object, an identification of a rights issuer of said digital rights object, a uniform resource location of the rights issuer and an alias of the rights issuer.

5. The apparatus according to claim 1, wherein the parser is adapted to acquire a signature of the rights issuer and information related thereto as part of the first information.

6. The apparatus according to claim 1, wherein the signature generator is adapted to generate the signature based on the originating device's private key used in an asymmetric key algorithm.

7. The apparatus according to claim 6, wherein the signature generator is adapted to calculate the signature with the private key over the first information and the encrypted second information.

8. The apparatus according to claim 1, wherein the originating device is a OMA DRM conformant device and wherein the digital rights object is a OMA DRM conformant rights object.

9. A method for storing a backup version of a digital rights object bound to an originating device and related to a digital media content, the method comprising:

acquiring first information of the digital rights object, the first information not being critical for a usage of the digital media content, and acquiring second information of the digital rights object, the second information being critical for the usage of the digital media content, wherein a rights encryption key of the digital rights object is acquired as at least a part of the second information, wherein the rights encryption key is used to encrypt/decrypt a content encryption key related to the digital media content;

encrypting the second information using a secret of the originating device to acquire encrypted second information, wherein the acquired rights encryption key is encrypted with a backup encryption key, wherein the backup encryption key is the secret of the originating device, wherein the backup encryption key is a cryptographic key for a symmetric key-algorithm, and wherein the backup encryption key is based on a further secret of the originating device and at least the first information, and wherein the first information is different for different backup rights objects;

generating a signature of the originating device over at least the first information of the digital rights object; and storing the first information in a way such that the first information is readable by at least a second device, to store the encrypted second information such that the encrypted second information is not readable by at least the second device, and to store the signature, such that the backup rights object comprises the stored first information, the encrypted second information and the signature.

10. A non-transitory computer readable medium including a computer program for carrying out, when the computer program runs on a computer or a micro-controller, a method for storing a backup version of a digital rights object bound to an originating device and related to a digital media content, the method comprising:

acquiring first information of the digital rights object, the first information not being critical for a usage of the digital media content, and acquiring second information of the digital rights object, the second information being critical for the usage of the digital media content, wherein a rights encryption key of the digital rights object is acquired as at least a part of the second information, wherein the rights encryption key is used to encrypt/decrypt a content encryption key related to the digital media content;

encrypting the second information using a secret of the originating device to acquire encrypted second information, wherein the acquired rights encryption key is encrypted with a backup encryption key, wherein the backup encryption key is the secret of the originating device, wherein the backup encryption key is a cryptographic key for a symmetric key-algorithm, and wherein the backup encryption key is based on a further secret of the originating device and at least the first information, and wherein the first information is different for different backup rights objects;

generating a signature of the originating device over at least the first information of the digital rights object; and storing the first information in a way such that the first information is readable by at least a second device, to store the encrypted second information such that the encrypted second information is not readable by at least the second device, and to store the signature, such that the backup rights object comprises the stored first information, the encrypted second information and the signature.

* * * * *